US010184210B1

(12) United States Patent
Volmut

(10) Patent No.: US 10,184,210 B1
(45) Date of Patent: Jan. 22, 2019

(54) SYSTEM AND METHOD FOR TRACKING, TREATING, AND LAUNDERING STAINS ON A FABRIC ITEM

(71) Applicant: Joan Volmut, Racine, WI (US)

(72) Inventor: Joan Volmut, Racine, WI (US)

( * ) Notice: Subject to any disclaimer, the term of this patent is extended or adjusted under 35 U.S.C. 154(b) by 0 days.

(21) Appl. No.: 16/101,087

(22) Filed: Aug. 10, 2018

Related U.S. Application Data

(63) Continuation-in-part of application No. 15/681,406, filed on Aug. 20, 2017, which is a continuation of application No. 15/239,426, filed on Aug. 17, 2016, now Pat. No. 9,767,332.

(60) Provisional application No. 62/206,376, filed on Aug. 18, 2015.

(51) Int. Cl.
*D06F 93/00* (2006.01)
*G06K 19/02* (2006.01)

(52) U.S. Cl.
CPC ......... *D06F 93/005* (2013.01); *G06K 19/027* (2013.01); *G06K 2207/1012* (2013.01)

(58) Field of Classification Search
None
See application file for complete search history.

(56) References Cited

U.S. PATENT DOCUMENTS

| 7,971,777 | B2 * | 7/2011 | Ha | D06F 58/10 235/375 |
| 2007/0250409 | A1 * | 10/2007 | Levy | G06Q 10/06 705/28 |

* cited by examiner

*Primary Examiner* — Kristy A Haupt
(74) *Attorney, Agent, or Firm* — Crawford Intellectual Property Law LLC; Brie A. Crawford; Marc J. Whipple

(57) ABSTRACT

A system and method for tracking, treating, and laundering stains on a fabric item is disclosed. The system and method uses a stain tracking app to store and transmit data about the stain to a piece of laundry equipment. The system and method optionally uses an RFID tag to mark the stain or stains on a fabric item and uses a transponder or smartphone to locate the RFID tag and the stained fabric item. The user is then able to precisely locate both the stained fabric item and the precise location of the stain or stains on the fabric item for an optional chemical pretreatment prior to laundering. The stain tracking application transmits information about the stain to the piece of laundry equipment which can then be used to determine optimal pre-treatment and cleaning parameters to optimize removal of the stain or stains.

6 Claims, 4 Drawing Sheets

SYSTEM AND METHOD FOR TRACKING, TREATING, AND LAUNDERING STAINS ON A FABRIC ITEM

CROSS REFERENCE TO RELATED APPLICATIONS AND INCORPORATION BY REFERENCE

This application is a continuation-in-part of and claims priority to the previously filed U.S. Utility patent application Ser. No. 15/681,406 titled SYSTEM AND METHOD FOR MARKING, TRACKING, AND LOCATING STAINS ON A FABRIC ITEM FOR APPLICATION OF A STAIN TREATMENT PRIOR TO LAUNDERING, with an application filing date of Aug. 20, 2017, filed in the United States Patent and Trademark Office, itself a continuation of and claiming the priority of U.S. Utility patent application Ser. No. 15/239,426 titled SYSTEM AND METHOD FOR MARKING, TRACKING, AND LOCATING STAINS ON A FABRIC ITEM FOR APPLICATION OF A STAIN TREATMENT PRIOR TO LAUNDERING, with an application filing date of Aug. 17, 2016, filed in the United States Patent and Trademark Office, itself claiming the priority of U.S. Utility Provisional Patent Application No. 62/206,376, also titled SYSTEM AND METHOD FOR MARKING, TRACKING AND LOCATING STAINS ON A FABRIC ITEM FOR APPLICATION OF A STAIN TREATMENT PRIOR TO LAUNDERING, with an application filing date of Aug. 18, 2015, filed in the United States Patent and Trademark Office.

Application Ser. No. 15/681,406, application Ser. No. 15/239,426 and Provisional Application No. 62/206,376 were all invented by the same inventive entity, and the entirety of all three applications are incorporated herein by reference in their entirety to provide continuity of disclosure. A Notice of Allowance was granted on application Ser. No. 15/239,426 on May 19, 2017 and it issued as U.S. Pat. No. 9,767,332 on Sep. 19, 2017. While a Final Rejection has been mailed on application Ser. No. 15/681,406, at the time of filing this continuation-in-part application, the Ser. No. 15/681,406 application is still pending and has not issued as a patent.

This application is a CONTINUATION-IN-PART of the previously-filed applications identified above and contains new matter not necessarily supported thereby.

FIELD OF THE INVENTION

This invention relates generally to a system and method for marking, tracking, and locating stains on a fabric item for application of a stain treatment prior to laundering and more particularly, to a system and method for tracking stains on a fabric item for application of a stain treatment prior to laundering and transmitting the stain information to one or more pieces of laundry equipment to be used to launder the fabric item. The system and method can use RFID technology or other means to mark and then, track and locate stains on a fabric item so that the stains can be treated with a chemical pretreatment prior to laundering and communicates the stain tracking information to one or more pieces of laundry equipment so that it can be displayed and the stains treated appropriately when the item is laundered.

BACKGROUND OF THE INVENTION

Fabric items and fabric item stains have coexisted for as long as fabric items have been made. Fabric items can, for example, be wearable apparel items or non-wearable items. Further, food stains, grass stains, and stains of all sorts are common to both wearable apparel items and non-wearable items. One reality of treating and removing fabric stains is that such stains must be treated with some sort of chemical pretreatment prior to laundering. In most instances, however, it is not practical to treat and launder the stained fabric item immediately upon the stain occurring. For this reason, as is true in most households, stained fabric items tend to be accumulated with other fabric items for washing at a later time. However, by the time the stained and non-stained items are sorted for washing, it may be hard to locate each stained item and the exact area that is stained. Thus, stained items may be laundered without a chemical pretreatment due to error and the fabric item may be ruined. A system and method for marking, tracking, and locating stained fabric items for application of a stain treatment prior to laundering is a useful invention.

A fabric item may be stained and then, placed in a laundry hamper for an extended period of time before laundering. By the time the laundry is sorted for laundering, the stained fabric item may be forgotten and placed in the laundering equipment as if it were not stained. The proper chemical pretreatment may not be applied to the stained fabric item and as a result, it may be ruined after laundering. A system and method that can mark, and then locate and track stained items in a pile of stained and non-stained items is a useful invention.

Also, if there is an extended period of time between the fabric item being stained and laundering, a user may remember that a particular fabric item is stained, but may not remember precisely where the stain is. If the stain cannot be located, it cannot be pretreated and the fabric item can be ruined. If there are multiple stains, then the user may chemically pretreat one stain, but may miss the others and again, the fabric item may be ruined. A system and method that can mark, and then locate and track not only the fabric item that is stained, but the precise location of the stain or stains is a useful invention.

Finally, most laundry equipment uses a range of preset parameters to perform cleaning cycles on fabric items to be laundered. For example, a washing machine may have a range of water temperatures for a presoak cycle, a washing cycle, and a rinsing cycle, with water temperature for each cycle being anywhere from "cold" to "hot," and with several points of gradation between. Similarly, the washing machine may have agitation parameters from "delicate" to "heavy-duty." The presence of a particular kind of stain on a fabric item can make it desirable for the washing parameters to be changed from what would normally be used for that item. For example, exposure to heat will "set" or make some stains more difficult to remove completely, whereas for others hot water is a more effective solvent. Likewise, the use of various detergents or fabric treating agents may be contraindicated when trying to remove some stains. A system and method that can track information about stains and communicate it to a control and/or display mechanism in a laundry machine so that the stains can be viewed and appropriate steps taken to treat and launder them is a useful invention.

SUMMARY OF THE INVENTION

An objective of the present invention is the provision of a system and method for marking, tracking, and locating stains on a fabric item for application of a stain treatment prior to laundering that is used to locate stains on washable fabric items such that a prewash stain treatment can be applied to the stain prior to laundering of the stained fabric item.

Another objective of the present invention is the provision of a system and method for marking, tracking, and locating stains on a fabric item for application of a stain treatment prior to laundering that can effectively and electronically sort stained fabric items from unstained fabric items when they are intermingled with general laundry.

Moreover, an objective of the present invention is the provision of a system and method for marking, tracking, and locating stains on a fabric item for application of a stain treatment prior to laundering that allows a user to precisely locate and treat the stained area prior to laundering.

Also, an objective of the present invention is the provision of a system and method for marking, tracking, and locating stains on a fabric item for application of a stain treatment prior to laundering that uses a plurality of RFID tags that can be attached to a stained fabric item and specifically, to that area of the stained fabric item where the stain is located to allow the user, using a transponder device, to locate such stains precisely and accurately.

A still further objective of the present invention is the provision of a system and method for marking, tracking, and locating stains on a fabric item for application of a stain treatment prior to laundering that upon activation of a transponder device, RFID tags can be activated to emit a sound, a light, or other indicator which can then allow the user to locate the stained area of the fabric item and treat the stained area with a prewash stain treatment prior to laundering.

An additional objective of the present invention is the provision of a system and method for marking, tracking, and locating stains on a fabric item for application of a stain treatment prior to laundering that can communicate information about the stain to one or more pieces of laundry equipment having a display unit which can provide information about the stains to ensure optimal treatment when laundering the fabric item.

These and other objectives of the invention (which other objectives become clear by consideration of the specification, claims, and drawings as a whole) are met by providing a system and method for marking, tracking, and locating stains on a fabric item for application of a stain treatment prior to laundering that tracks and locate stains on a fabric item so that the stains can be treated with a chemical pretreatment prior to laundering and can communicate information about the stain to one or more pieces of laundry equipment having a display unit which displays information about the stains to allow treatment and achieve the optimal result when laundering the fabric item.

BRIEF DESCRIPTION OF THE DRAWINGS

Throughout the figures of the drawings, where the same part appears in one or more than one figure of the drawings, the same number is applied thereto.

DETAILED DESCRIPTION OF THE PREFERRED EMBODIMENTS

Figure 1:
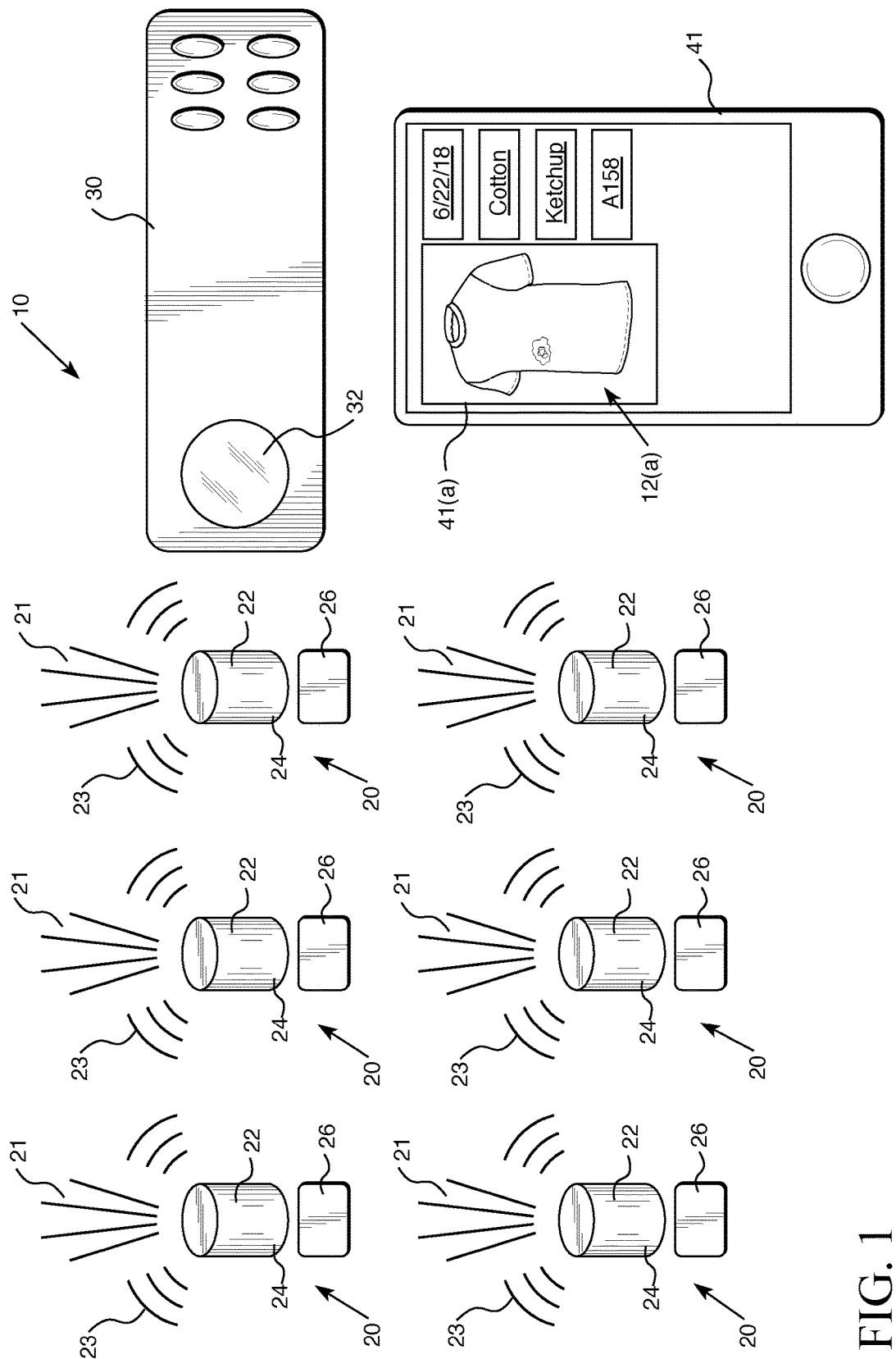
FIG. 1 depicts a top plan view of the elements of a preferred embodiment incorporating RFID tags.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

Radio frequency identification technology is well known. It will be referred to as RFID technology or RFID throughout this application. U.S. Pat. No. 7,199,719 issued to Steinberg, titled "RFID Tag Reader with Tag Location Indicated by Visible Light Beam", discloses RFID technology that uses light emissions to allow a user to locate the tags. U.S. Pat. No. 6,674,364 issued to Holbrook et al., titled "Object Finder", discloses RFID technology that uses sound and light emissions to locate the tags. United U.S. Pat. No. 8,222,996 issued to Smith et al., titled "Radio Frequency Identification Tags Adapted for Localization and State Indication", discloses RFID technology that uses LED light emissions to locate the tags. All parts of these patents necessary to enable this disclosure are herein incorporated by reference.

There are a number of commercially available transponders and RFID tags with a variety of features. Any of these transponder and tag_sets can be utilized as part of the system and method of this invention. The transponder can be a commercially available transponder or it can be a cell phone (or smartphone) with the appropriate hardware, software, and mobile applications to allow the cell phone to communicate with the RFID tags.

Figure 2:
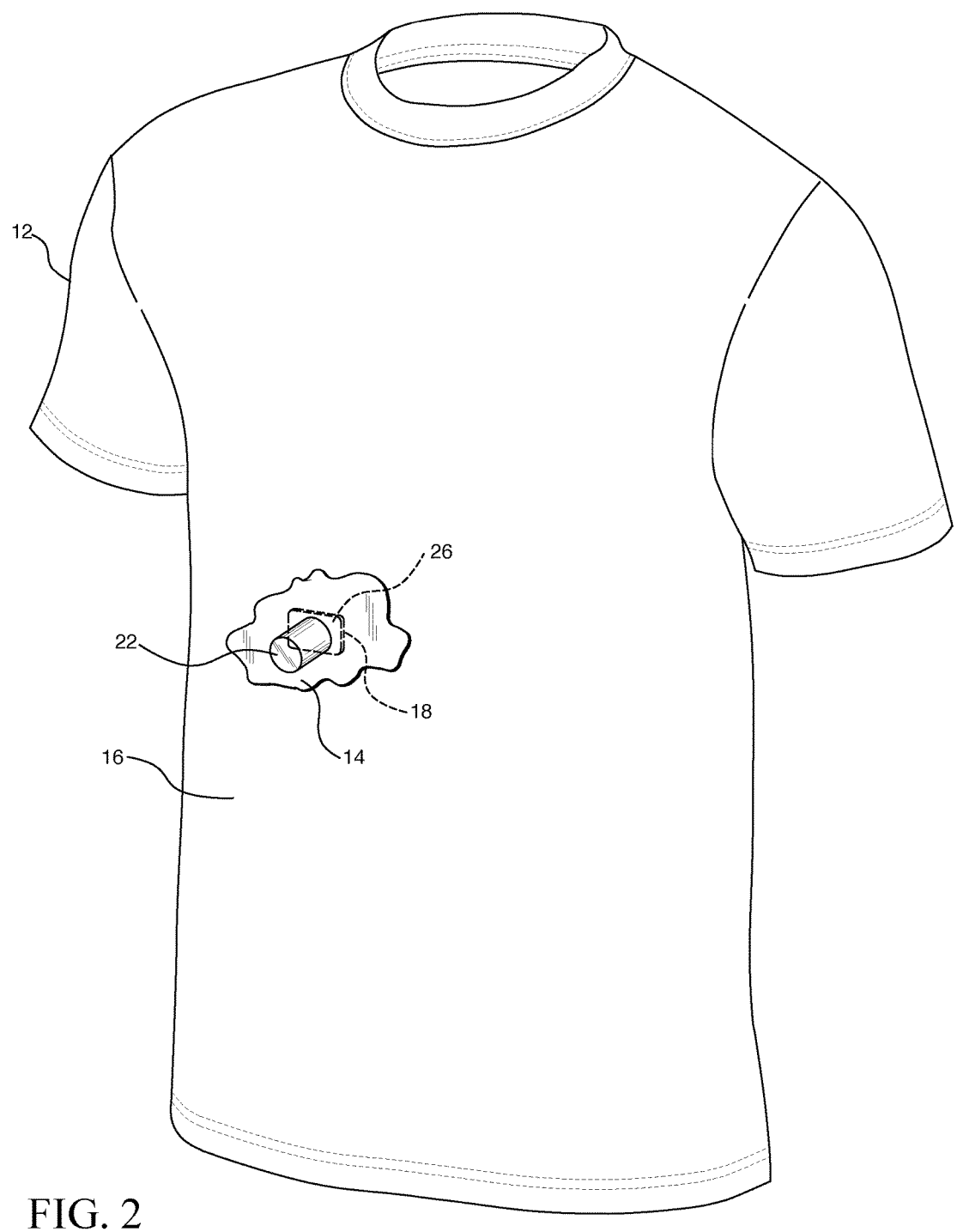
FIG. 2 depicts a left, front perspective view of a fabric item with an RFID tag marking a stain.

Now adding FIG. 1 and FIG. 2 to the consideration, the elements and function of a preferred embodiment of system and method 10 can be clearly seen. System 10 comprises one or a plurality of optional electronic RFID tags 20 that can be applied, one at a time, to stained fabric item 12 (see FIG. 2.) Optional transponder 30 communicates with RFID tags 20 to locate stained fabric items 12.

Each RFID tag 20 comprises tag housing 22 within which is housed electronic circuitry (not shown). Although six such RFID tags 20 are shown in FIG. 1, the present invention is not limited to that number of RFID tags 20 as any number of RFID tags 20 may be used, depending on the number of stained fabric items 12 or the number of stains 14 on each stained fabric item 12 that require chemical pretreatment. All such numbers of RFID tags 20 are encompassed by this disclosure.

One side 24 of tag housing 22 is a metallic surface that is ferrous in nature, thereby making RFID tag 20 attachable to stained fabric item 12 via magnet 26. Magnet 26 is the preferred embodiment for attaching RFID tags 20 to stained fabric item 12 as magnet 26 will not damage or leave holes in fabric item 12. However, there are other suitable attachment means to secure RFID tag 20 to stained fabric item 12 such as clips, pins, and any other suitable attachment mechanism and all are encompassed by this disclosure.

As seen in the cited patents, there are a variety of features that exist in the market for RFID tag 20 and transponder 30. Some desired features of any RFID tag 20 that is used with system and method 10 include an on-board power supply, such as a battery, and RFID capability. Each RFID tag 20 further comprises signal emission functionality, which can be either via a visual signal 21, such as light emission, or via an audio signal 23, such as sound emission. Other signal emissions can be used as well, but those stated here are the preferred embodiments.

If there are multiple RFID tags 20 in close proximity, transponder 30 may activate all tags 20 and all tags 20 may emit visual signal 21 or audio signal 23. Or, the internal circuitry of RFID tags 20 and transponder 30 may allow transponder 30 to activate only one specific RFID tag 20 in the vicinity and cause only specific RFID tag 20 to emit visual signal 21 or audio signal 23 (U.S. Pat. No. 8,222,996).

It is also desirable for RFID tag 20 to have a power saving capability such that the electronics for RFID tag 20 can be placed in a sleep, standby, or power saving mode during which minimal power is consumed by RFID tag 20 to prolong battery life when not in use.

RFID tag 20 is activated into power mode by transponder 30. Transponder 30 has on/off button 32 which is used to activate the transmission of a wireless signal in the on position and stop the transmission in the off position. Upon activation of transponder 30 into power mode, the signal from transponder 30 will activate each RFID tag 20. An activated RFID tag 20 will emit a visual 21 and/or sound 23 signal that allows the user to locate each RFID tag 20 on each stained fabric item 12, remove RFID tag 20 from each stained fabric item 12, chemically pretreat stain 14, and place stained fabric item 12 into a smart washing machine. Once RFID tag 20 is removed, transponder 30 can be used to place each RFID tag 20 back into a sleep or standby mode for future use. Then, on/off button 32 is utilized to place transponder 30 into standby or sleep mode.

For purposes of this application, a "smart washing machine" is any laundry device which has all of the following properties:
1) It can clean stained clothing;
2) It can receive data transmissions from an electronic device such as a smartphone; and,
3) It can display information from such data transmissions on a display.

Smartphone 41 is running a stain-tracking app which allows a user of the invention to input information associated with the fabric item and the stain. This can be a wide variety of information: shown on the display of smartphone 41 are identifying information for the fabric item including a photograph 12(*a*) displayed in photo display area 41(*a*), the date and/or time of the stain (here "6/22/18,") identifying information for the fabric of the fabric item (here, "Cotton,") identifying information for the stain (here, "Ketchup,") and identifying information for the particular RFID tag which is used to mark the stain if an optional RFID tag is used (here, a symbolic code "A1F8.") This information is stored in the stain tracking app for later communication to the smart washing machine (see FIG. 4.)

If the optional RFID tags are used, it is optional to use transponder 30 if smartphone 41 can be used to interact with the RFID tags. It is preferred, but not required, to use RFID tags: information about the stain location can simply be entered as text in the fabric item's entry in the stain tracking app. In an alternate embodiment (not shown,) simple passive markers, magnetic or otherwise, can be used, and identifying information about those markers can be entered into the stain as text in the fabric item's entry in the stain tracking app.

Figure 3:
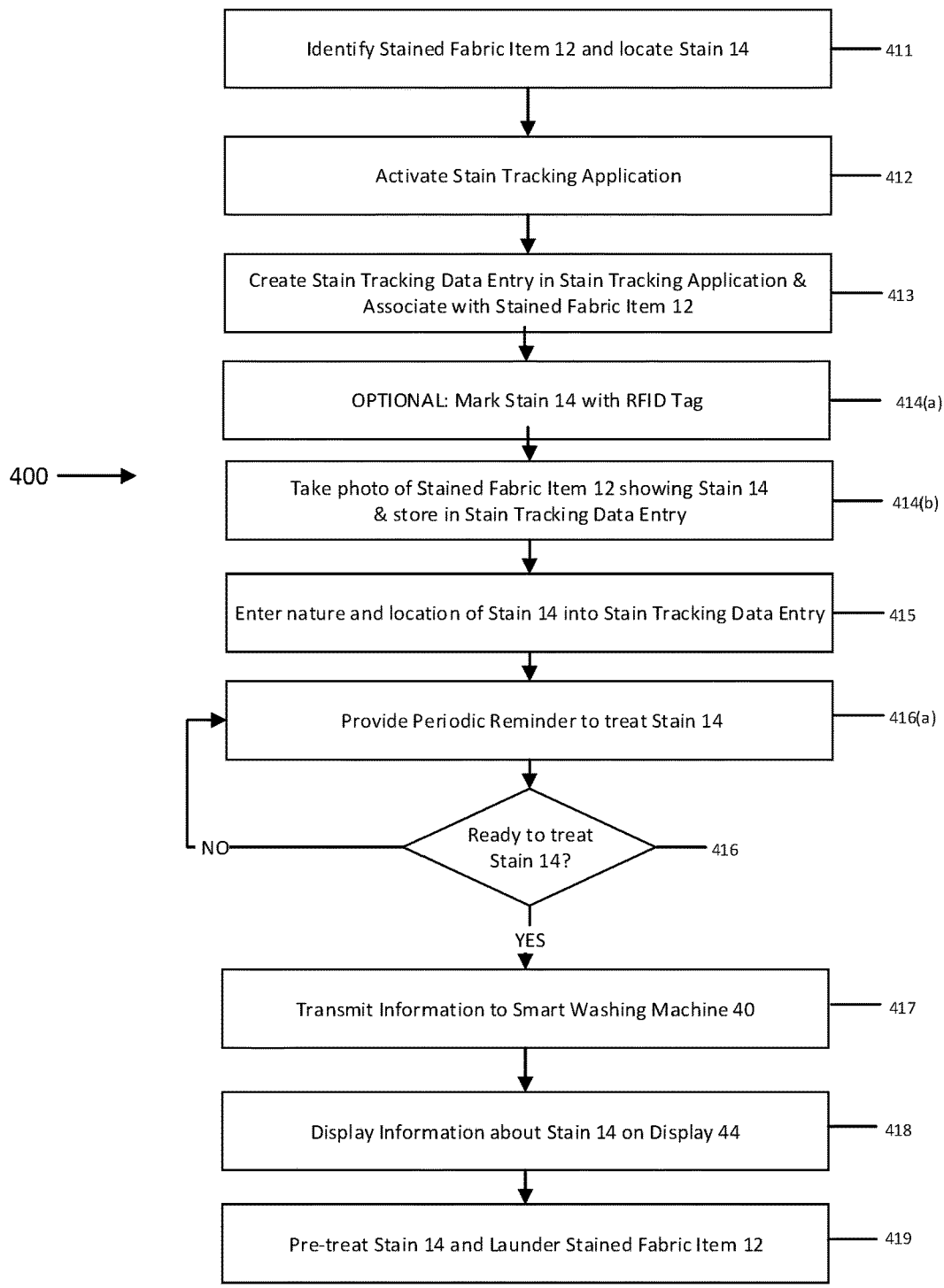
FIG. 3 depicts a flow chart of the use of the system and method of the invention.

Now adding FIG. 3 to the consideration, the function and process of the system and method can be clearly seen. Method 400 begins when a user has stained fabric item 12. The user locates stain 14 on stained fabric item 12 in Step 411 and activates the stain tracking application in Step 412.

In Step 413 the user then creates a stain tracking entry in the stain tracking application which runs on smartphone 41 (see FIG. 1, FIG. 4) and associates it with stained fabric item 14. Although identified as a smartphone, the device to which this step refers can be a tablet, a smartphone, a general-purpose digital computer, or a special-purpose electronic device: this applies to any identification of a device as a "smartphone" throughout this application. It is required that smartphone 41, however it is embodied, be able to accept information about stained fabric items and the stains thereon, and transmit that information to a smart washing machine (see FIG. 4.)

In first optional step 414(*a*,) stain 14 is marked with an RFID tag (see FIG. 3.) In an alternate embodiment (not shown,) stain 14 can be marked with an optional passive marker containing no electronics.

Generally, once RFID tags 20 are applied, if they are used, stained fabric item 12 and other stained or worn items are piled in a laundry basket, hamper, or on the floor with non-stained fabric items. However, method 400 only requires the user to be in the proximity of stained fabric item 12 with attached RFID tags 20 regardless of location, proximity to non-stained fabric items, or method of storage.

When the user desires to locate stained fabric item 12 with attached RFID tags 20 if they are used, the user approaches the location of the stained fabric item 12. The user activates transponder 30 (see FIG. 1) through on/off button 32. Transponder 30 activates RFID tags 20 and RFID tags 20 emit visual signal 21 or audio signal 23. The user locates stained fabric items 12 through visual signal 21 or audio signal 23. The user retrieves stained fabric item 12 from the pile and removes RFID tags 20. Then, the user pretreats stain 14 on stained fabric item 12 before laundering. Alternatively, smartphone 41 (see FIGS. 1 and 4) can be used for this purpose.

In Step 414(*b*,) after a stain occurs, smartphone 41 is used to take a photograph of stained fabric item 12 and the photograph is stored in the stain tracking application. It is preferred, but not required, to allow the user to indicate where stain 14 is located in the photo (e.g. by tapping on the photo to mark the location.)

In step 415, the nature and location of stain 14 are entered into the stain data tracking entry, including information related to the RFID tag or other marker if used and/or the photograph if used.

In step 416(*a*,) the stain tracking application provides periodic reminders to treat stain 14 by any convenient means, including but not limited to messages displayed on smartphone 41 (see FIGS. 1 and 4,) emails, text messages, and/or sound and/or video alerts.

In step 416, the user determines whether they are ready to treat stain 14. When they are ready, the method proceeds to the next step.

Figure 4:
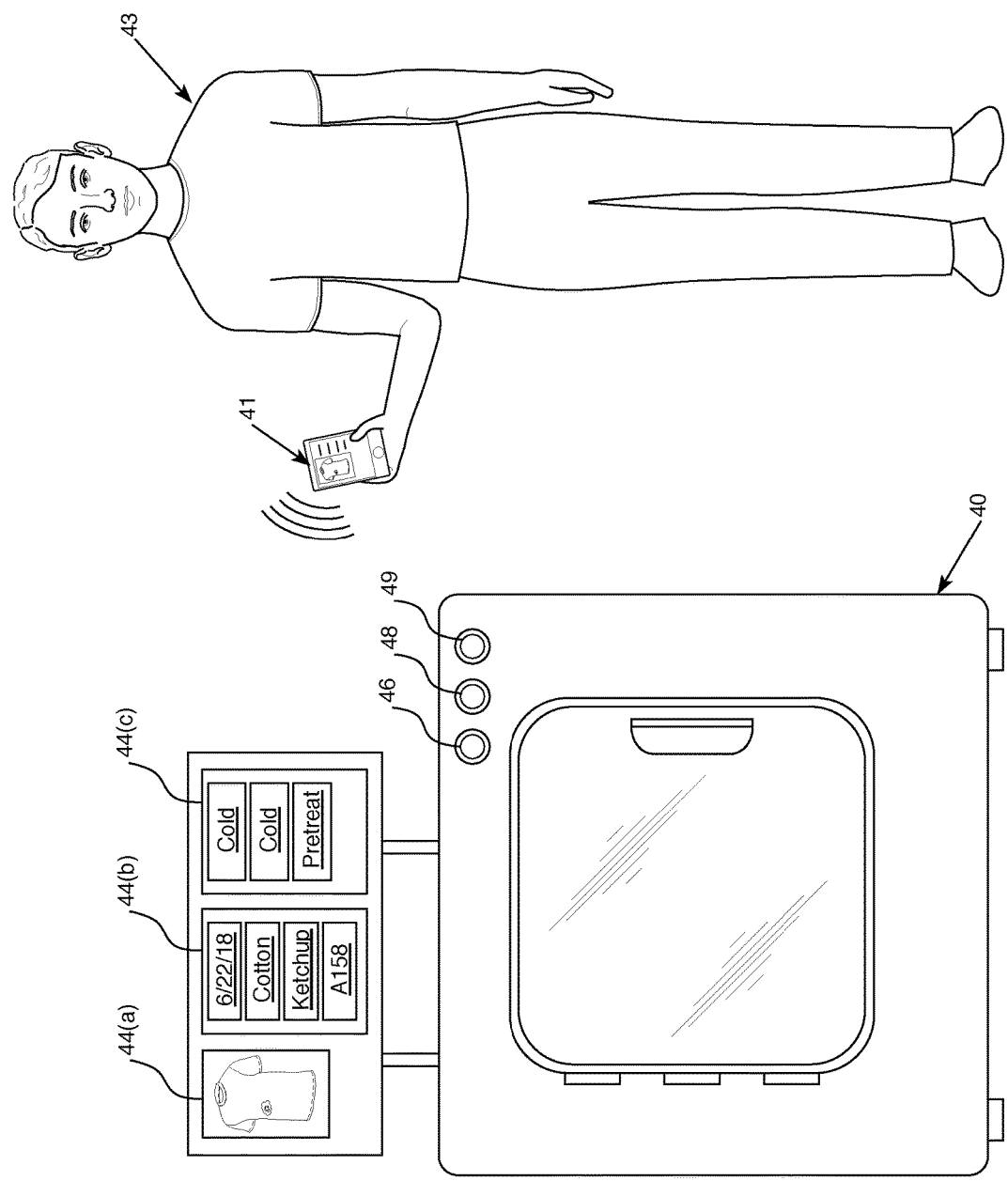
FIG. 4 depicts an abstracted front view of a "smart" washing machine, smartphone, and user of the invention.

In step 417, smartphone 41 transmits the information in the stain tracking data entry to smart washing machine 40 (see FIG. 4.)

In step 418, the information from the stain tracking data entry is displayed on Display 44. It is required that this information be transmitted to smart washing machine 40 as in step 417, but the user may review it on smartphone 41 while preparing to launder stained fabric item 12. If this is done the user may have no need to review the information on display 44 (see FIG. 4.)

In step 419, the user pre-treats stain 14 based upon the stain tracking data entry information and then launders stained fabric item 12 with smart washing machine 40 (see FIG. 4).

An optional improvement to this embodiment (not shown) allows the stain tracking application to be accessed by more than one person and/or installed on more than one smartphone. This allows multiple users to track stain data which can then be shared through the stain tracking application and/or the smart washing machine. A single person can then pre-treat stained items belonging to multiple persons, for example a parent can pre-treat stained items belonging to one or more children and each child can input stain data if they stain an item.

Now adding FIG. 4 to the consideration, the implementation of the invention is easily understood. User 43 accesses the stain tracking app on smartphone 41 to retrieve the information about the stain. The information is transmitted from smartphone 41 by any convenient means including but not limited to the global computer network, a local wireless network, a physical connection, or Near Field Communication to smart washing machine 40. The information is displayed on display 44, including item photo display 44(*a*), stain info 44(*b*,) and optional preferred treatment identifier 44(*c*.) The user can then pre-treat stains and then manually set the cleaning parameters with controls 46, 48, and 49 in accordance with the recommendations of the stain tracking app as shown on display 44. The fabric item (not shown) is inserted into smart washing machine 40, smart washing machine 40 is activated, and the fabric item is laundered in accordance with the set cleaning parameters.

In view of the foregoing, it will be appreciated that there is provided, via this invention, a system and method that is used to mark, track, and locate stains in washable fabric items such that a prewash stain treatment can be applied to the stain prior to laundering of the stained fabric item, and information about the stains can be transmitted to laundry equipment to optimize the removal of the stains. Using this system and method as described, stained fabric items can be effectively and electronically sorted from unstained fabric items. The system and method of the present invention allows a user to precisely locate and treat the stained area prior to laundering. The system and method of the present invention allows a user to review information about and pre-treat stains and manually set the cleaning parameters of a piece of laundry equipment to optimize the removal of the stains.

This application—taken as a whole with the abstract, specification, claims, and drawings—provides sufficient information for a person having ordinary skill in the art to practice the invention disclosed and claimed herein.

Any measures necessary to practice this invention are well within the skill of a person having ordinary skill in this art after that person has made a careful study of this disclosure.

Because of this disclosure and solely because of this disclosure, modification of this system and method can become clear to a person having ordinary skill in this particular art. Such modifications are clearly covered by this disclosure.

What is claimed and sought to be protected by Letters Patent is:

1. A method for tracking, treating, and laundering stains on a fabric item comprising the steps of:
    a) locating a stain having a stain location on a fabric item;
    b) activating a stain tracking application on an electronic device;
    c) creating a stain tracking data entry in the stain tracking application, the stain tracking data entry being associated with the fabric item and containing at least two stain tracking data fields including a location stain tracking data field and a type stain tracking data field;
    d) entering the stain location into the location stain tracking data field and a stain type into the type stain tracking data field, the stain location and the stain type being associated with the stain;
    e) transmitting the stain tracking data entry including the type stain tracking data field and the location stain tracking data field to a smart washing machine;
    f) displaying the stain tracking data entry including the type stain tracking data field and the location stain tracking data field on a display, the display operably connected to the smart washing machine;
    g) pre-treating the stain based on the stain tracking data entry displayed on the display;
    h) setting a plurality of cleaning parameters on the smart washing machine;
    i) inserting the fabric item into the smart washing machine; and,
    j) activating the smart washing machine so that the fabric item is laundered according to the plurality of cleaning parameters.

2. A method for tracking, treating, and laundering stains on a fabric item comprising the steps of:
    a) locating a stain having a stain location on a fabric item;
    b) activating a stain tracking application on an electronic device;
    c) creating a stain tracking data entry in the stain tracking application, the stain tracking data entry being associated with the fabric item and containing at least two stain tracking data fields including a location stain tracking data field and a type stain tracking data field;
    d) entering the stain location into the location stain tracking data field and a stain type into the type stain tracking data field, the stain location and the stain type being associated with the stain;
    e) affixing a removably affixable RFID tag to the fabric item at the stain location;
    f) using a transponder to locate the removably affixable RFID tag on the fabric item, the transponder comprising either the electronic device or a special-purpose transponder;
    g) transmitting the stain tracking data entry including the type stain tracking data field and the location stain tracking data field to a smart washing machine;
    h) displaying the stain tracking data entry including the type stain tracking data field and the location stain tracking data field on a display, the display operably connected to the smart washing machine;
    i) pre-treating the stain based on the stain tracking data entry displayed on the display;
    j) setting a plurality of cleaning parameters on the smart washing machine;
    k) inserting the fabric item into the smart washing machine; and, l) activating the smart washing machine so that the fabric item is laundered according to the plurality of cleaning parameters.

3. A method for tracking, treating, and laundering stains on a fabric item as in claim 2 wherein the RFID tag is caused to emit an emission by the transponder.

4. A system for tracking, treating, and laundering stains on a fabric item comprising:
 a) a stain tracking application on an electronic device;
 b) a stain tracking data entry in the stain tracking application, the stain tracking data entry being associated with a stain located on a fabric item and containing at least two stain tracking data fields;
 c) a location stain tracking data field and a type stain tracking data field, the location stain tracking data field and the type stain tracking data field being two of the at least two stain data tracking fields;
 d) a smart washing machine, the smart washing machine receiving a data transmission from the electronic device, the data transmission containing at least one of the at least two stain data tracking fields; and,
 e) a display, the display operably affixed to the smart washing machine and displaying the data transmission.

5. A system for tracking, treating, and laundering stains on a fabric item as in claim 4, further comprising:
 a) at least one RFID tag, the at least one RFID tag being removably affixable to the fabric item at a location of the stain.

6. A system for tracking, treating, and laundering stains on a fabric item as in claim 5 further comprising:
 a) a transponder, the transponder being able to send an activating signal to the at least one RFID tag causing the at least one RFID tag to emit a sound and/or display a light.

\* \* \* \* \*